May 5, 1953     D. R. DE BOISBLANC     2,637,207

MAGNETIC FLOWMETER

Filed Oct. 31, 1949

INVENTOR.
D. R. DE BOISBLANC

BY *Hudson & Young*

ATTORNEYS

Patented May 5, 1953

2,637,207

UNITED STATES PATENT OFFICE 2,637,207

MAGNETIC FLOWMETER

Deslonde R. de Boisblanc, Bartlesville, Okla., assignor to Phillips Petroleum Company, a corporation of Delaware Application October 31, 1949, Serial No. 124,668

10 Claims. (Cl. 73—194)

This invention relates to flowmeters.

Heretofore, considerable difficulty has been experienced in measuring flow rates due to the inertia or friction of moving parts in flowmeters wherein the flow of fluid produces rotation of an element positioned in the path of fluid flow. Difficulties are also encountered due to the varying rates of flow at the center of the conduit through which the fluid is flowing, as compared with the rate of flow at the periphery of the conduit.

These difficulties have been somewhat minimized by the use of a magnetic type flowmeter, as described and claimed in Patent 2,149,847 to Kolin. According to this patent, a magnetic field is established in the conduit through which the fluid flows, this magnetic field being positioned at an angle with respect to the direction of fluid flow. The potential gradient through the liquid across the conduit is measured by contacts so positioned as to include the fluid in a conductive path therewith. The patentee points out that, with this arrangement, a voltage is produced across the electrodes when the magnetic field is established in accordance with the following formula:

$$E = Hlv10^{-8}$$

Where
E is the induced voltage,
H is the strength of the field,
$l$ is the width of the flowing stream intercepted by the flux,
$v$ is the velocity of flow.

Where an electromagnet energized by alternating current is used to produce the field:

$$H = f(t)$$

Where $t$ is the time. Therefore, $$E = f(t)lv10^{-8} + A$$

In this equation, A is the voltage induced in the fluid when it is not moving past the electrodes, that is, under no flow conditions. I have discovered that this factor A varies, to a large extent, in accordance with the conductivity of the fluid to be measured, thereby introducing large, unknown errors if fluids of non-homogeneous conductivities are measured and totalized. It was found that this error could not be eliminated by placing an adjustable pickup loop in the magnetic field in series with the electrodes so as to cancel out the voltage at zero flow or, alternatively, by adding a balancing signal of predetermined magnitude and phase to the signal produced by the flowmeter. Although a balanced condition may be obtained by either of these methods at one particular value of fluid conductivity, the error is not compensated for at other values of fluid conductivity. Hence, changes in conductivity produce substantial errors in the measured flow rate even when a pickup loop is utilized or when a balancing voltage is introduced.

In accordance with this invention, the effect of conductivity upon the flowmeter reading is completely eliminated by first passing the fluid through the magnetic field between one pair of electrodes and then returning the fluid back through the magnetic field between a second pair of electrodes. This reverses the relative phase of the voltages induced between the two sets of electrodes under zero flow conditions so that the effect of the conductivity changes upon the output of the flowmeter are eliminated. The voltages produced by the fluid flow, however, are in phase and are not eliminated. That is, the term A in the aforementioned equation is cancelled out for all values of fluid conductivity.

It is an object of the invention to provide a flowmeter of the magnetic type in which the fluid path is geometrically simple so that the pressure drop therethrough is small and the parts are readily accessible for cleaning and servicing.

It is a further object to provide a flowmeter which may be permanently calibrated so that it is unaffected by changes in fluid conductivity or by the presence of air bubbles in the fluid.

It is a still further object to provide a flowmeter which is rugged in construction, simple to manufacture, and in which the flow measurement is independent of the velocity profile in the conduit.

Various other objects, advantages and features of the invention will become apparent from the following detailed description taken in conjunction with the appended drawings, in which.

Figure 1:
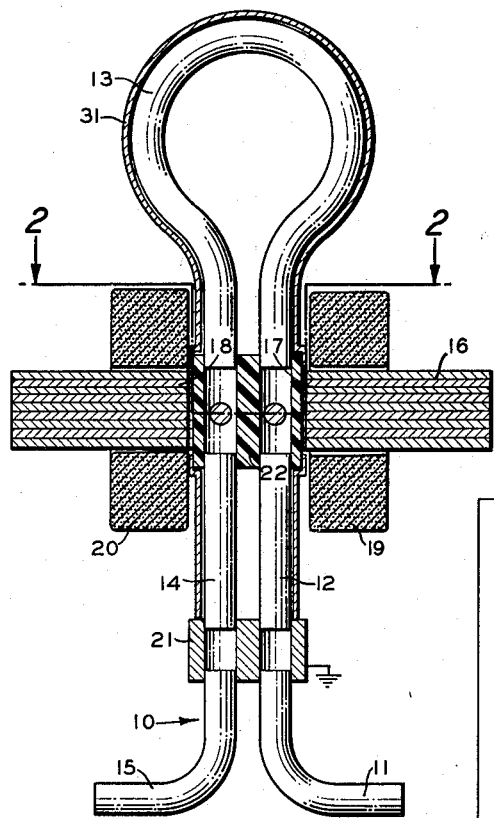
Figure 1 is a vertical, sectional view, partially in elevation, of the flowmeter of this invention.
Figure 2:
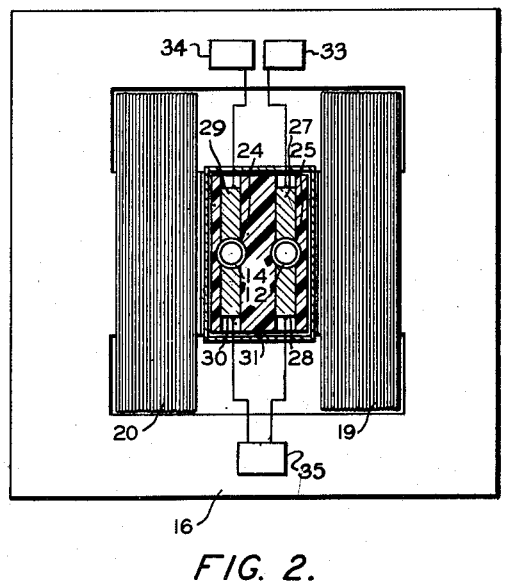
Figure 2 is a sectional view taken along the line 2—2 of Figure 1.

Referring now to Figures 1 and 2, the fluid whose flow velocity is to be measured passes through a conduit 10 having an inlet portion 11, a straight portion 12, a loop 13, a return portion 14 and an outlet portion 15. Mounted adjacent the straight portions 12, 14 is a generally rectangular laminated core 16 of magnetic material which is provided with pole pieces 17, 18 adjacent the respective portions 12 and 14, an alternating magnetic field being established in the core by a pair of coils 19, 20 positioned adjacent the respective pole pieces 17 and 18. The conduit 10 is supported by two blocks 21 and 22, block 21 being formed from metal and block 22 being formed from non-magnetic plastic material, such as Lucite. Both blocks are provided with longitudinal passages for receiving the two sections of the conduit. The block 22 is further provided with two sets of transverse passages in which are mounted, respectively, two sets 27, 28 and 29, 30 of electrodes, each such electrode having a curved face fitting closely against the adjacent portion 12 or 14 of the conduit 10 or extending into the conduit. Output terminals 33 and 34 are connected to respective electrodes 27 and 29 and an output terminal 35 is connected to both electrodes 28 and 30. The loop 13 together with the straight portions 12, 14 is preferably housed within an electrostatic shield 31 to eliminate capacitive coupling between the electrodes and the coils 19 and 20.

It will be evident from Figures 1 and 2 that the fluid whose flow rate is to be measured passes in one direction through the conduit portion 12 between the electrodes 27, 28 and then returns in the opposite direction through the conduit portion 14 between electrodes 29 and 30. The parts of the flowmeter are very carefully constructed so that the entire assembly is geometrically symmetrical. Thus, for example, the conduit portions 12, 14 are of the same diameter and they are positioned equidistantly from the center of the geometrically symmetrical coil and core structure. Further, the electrodes are all of the same size and configuration and they are likewise positioned equidistantly from the center of symmetry of the core-coil assembly. The effect of a conducting path through the liquid to ground from each electrode set is eliminated by grounding the copper block 21 so that the effective path length from each electrode to ground is very nearly the same for both sets of electrodes. Accordingly, when the fluid in conduit 10 is stationary, the voltages induced between the electrodes are equal and of opposite phase despite variations in the conductivity of the fluid in the conduit, thus attaining a major object of my invention in eliminating the effect of variations in fluid conductivity from the output signal of the flowmeter.

When the fluid flows through the conduit, a force acts upon each charged particle in the fluid as it passes through the magnetic field established by coils 19, 20 and core 16, the force being proportional to the flow velocity and to the intensity of the magnetic field, this force causing a transverse movement of the particles between the electrodes, thus constituting an induced flow of electric current. The fluid is electrically coupled to the electrodes either by a direct electrical connection or by the capacitance between the electrodes and the fluid. The particle movement is transverse, of course, since the direction of particle motion is mutually perpendicular to the direction of movement of the charged particle and the direction of the magnetic field. The polarity of the electrodes is so arranged that the voltage produced by this transverse movement of charged particles is of equal magnitude and similar phase between the two electrode sets 27, 28 and 29, 30. As a result, the voltage appearing across the complete flowmeter assembly when the two sets of electrodes are connected in series is a function of the flow velocity but it is independent of the electrical conductivity of the fluid passing through the conduit.

Figure 3:
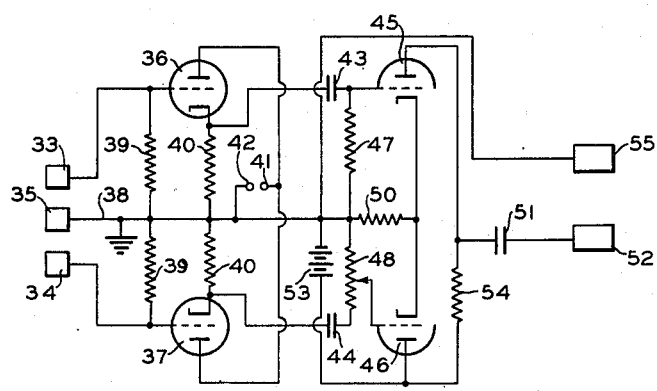
Figure 3 is a schematic circuit diagram of a differential amplifier utilized with the flowmeter of Figures 1 and 2.

The desired output voltage may readily be obtained from the differential amplifier shown by Figure 3 in which three input terminals 33, 34 and 35 are connected, respectively, to the control grids of a pair of electron tubes 36, 37 and to a grounded conductor 38. One set of electrodes 27, 28 is connected to input terminals 33, 35 and the other set of electrodes 29, 30 is connected to input terminals 34, 35. The control grid of each of the tubes 36, 37 is connected to ground through a resistor 39, the cathode of each tube is connected through a bias resistor 40 to ground and the anode of each tube is connected to a positive power supply terminal 41, the negative supply terminal 42 being grounded. The cathodes of tubes 36, 37 are further connected through the respective coupling condensers 43, 44 to the control grids of a pair of tubes 45, 46, the control grid of tube 45 being connected to ground through a fixed resistor 47 and the control grid of tube 46 being connected to ground through a variable resistor 48. The cathodes of tubes 45, 46 are each connected to ground through a common bias resistor 50. The anode of tube 45 is connected through a coupling condenser 51 to an output terminal 52 and to the positive terminal of a battery 53 through a load resistance 54, the negative terminal of the battery being connected to an output terminal 55. The anode of tube 46 is connected through the resistor 54 and condenser 51 to output terminal 52. It will be apparent that tubes 36, 45 amplify the signal appearing across one set of electrodes and this amplified voltage is added to the amplified voltage appearing across the other set of electrodes, this latter voltage being amplified by tubes 37 and 46. The relative amplification of the signals is controlled by the variable resistance 48.

By the use of the amplifier of Figure 3, the signals resulting from the no flow currents appearing between the two sets of electrodes are eliminated since they are of opposite phase and cancel out when the two amplified voltages are added together. The signal resulting from the flow of fluid past the two sets of electrodes, however, are added since they are of the same phase and, hence, the resultant signal appearing across output terminals 52, 55 is a function only of fluid velocity in the conduit 10. It may be pointed out, as a feature of the invention, that the resistor 48 is adjusted once to compensate for the no flow voltages produced by any desired fluid. Thereafter, no further adjustments nor recalibration of the instrument are necessary despite large variations in the conductivity of the fluid passing through conduit 10.

While the invention has been described in connection with a present, preferred embodiment thereof, it is to be understood that this description is illustrative only and is not intended to limit the invention, the scope of which is defined by the appended claims.

I claim:

1. In a flowmeter, in combination, a conduit for carrying a fluid whose velocity is to be measured, means for establishing an alternating magnetic field in said conduit, said conduit having a bent portion so that the fluid therein passes through said field in one direction and then returns through the field in the opposite direction, means for measuring the potential induced in the flowing fluid by said field at two sections of said conduit at regions of equal magnetic field strength, the fluid flowing in opposite directions through said section, and means for adding the velocity components of the induced voltages in phase with one another.

2. In a flowmeter, in combination, a conduit shaped to form a loop with two parallel straight portions connected to said loop so that fluid passing through said conduit passes in opposite directions through said straight portions, means for establishing an alternating magnetic field in the straight portions in both of said conduits, means for measuring the voltage induced in said flowing fluid in one of said straight portions, means for measuring the voltage induced in said flowing fluid in the other straight portion, said measurements being made at regions of equal magnetic field strength and means for adding the velocity components of said voltages in phase with one another to produce a resultant voltage.

3. In a flowmeter, in combination, a conduit having a section thereof shaped to form an inlet portion and an outlet portion, a pair of parallel straight portions having one end thereof connected to the respective inlet and outlet portions, the other end of said straight portions being connected by a loop, a magnetic structure including a core having a pair of pole pieces disposed adjacent the respective straight portions of said conduit to produce a magnetic field having a component normal to the direction of fluid flow in said straight portions, means for inducing an alternating magnetic field in said structure, two sets of electrodes, each set including two electrodes positioned at opposite sides of one of said straight portions in the region between said pole pieces, said pairs of electrodes being disposed in regions of equal magnetic field strength, and means for adding the velocity components of the voltages appearing across said sets of electrodes in phase with one another when fluid flows through said conduit.

4. In a flow meter, in combination, a conduit having a section thereof shaped to form an inlet portion and an outlet portion, a pair of parallel straight portions having one end thereof connected to the respective inlet and outlet portions, the other end of said straight portions being connected by a loop, a magnetic structure including a core having a pair of pole pieces disposed adjacent the respective straight portions of said conduit to produce a magnetic field having a component normal to the direction of fluid flow in said straight portions, means for inducing an alternating magnetic field in said structure, two sets of electrodes, each set including two electrodes positioned at opposite sides of one of said straight portions in the region between said pole pieces, said pairs of electrodes being disposed in regions of equal magnetic field strength, a pair of amplifiers each having its input circuit connected to one set of electrodes, means for varying the relative gain of said amplifiers to obtain a zero output signal under the conditions of zero flow, and means for adding the velocity components of the output voltages produced by said amplifiers in phase with one another to obtain a resultant voltage which is a function of the flow rate of liquid through said conduit.

5. A flowmeter in accordance with claim 4 in which an electrostatic shield is positioned about the straight portions and loop of said conduit.

6. A flowmeter comprising, in combination, a conduit having a section thereof shaped to form an inlet portion and an outlet portion, a pair of parallel straight portions having one end thereof connected to the respective inlet and outlet portions, the other end of said straight portions being connected by a loop, a magnetic structure including a core having a pair of pole pieces disposed adjacent the respective straight portions of said conduit to produce a magnetic field having a component normal to the direction of fluid flow in said straight portions, a coil for producing a magnetic field in said core, means for supplying alternating current to said coil, a block of non-magnetic material positioned between said pole pieces, said block having longitudinal passages formed therein for receiving the parallel straight portions of said conduit, a pair of transverse passages in said block communicating with each longitudinal passage, a pair of electrodes disposed in each transverse passage at regions of equal magnetic field strength, one end of each electrode engaging an adjacent surface of one of said straight conduit portions, and means for adding the velocity components of the voltages appearing across said sets of electrodes in phase with one another when fluid flows through said conduit.

7. A flowmeter comprising, in combination, a conduit having a section thereof shaped to form an inlet portion and an outlet portion, a pair of parallel straight portions having one end thereof connected to the respective inlet and outlet portions, the other end of said straight portions being connected by a loop, a magnetic structure including a core having a pair of pole pieces disposed adjacent the respective straight portions of said conduit to produce a magnetic field having a component normal to the direction of fluid flow in said straight portions, a coil for producing a magnetic field in said core, means for supplying alternating current to said coil, a block of non-magnetic material positioned between said pole pieces, said block having longitudinal passages formed therein for receiving the straight portions of said conduit, a pair of transverse passages in said block communicating with each longitudinal passage, a pair of electrodes disposed in each transverse passage at regions of equal magnetic field strength, one end of each electrode engaging an adjacent surface of one of said straight conduit portions, a pair of two-stage amplifiers each having its input circuit connected to one set of electrodes, means for varying the relative gain of said amplifiers to obtain a zero output signal under the condition of zero flow, and means for adding the velocity components of the output voltages produced by said amplifiers in phase with one another to obtain a resultant voltage which is a function of the flow rate of liquid through said conduit.

8. A flowmeter constructed in accordance with claim 7 in which a copper block is spaced longitudinally from said first block of non-magnetic material, said copper block having parallel longitudinal passages for receiving the respective straight sections of said conduit.

9. A flowmeter constructed in accordance with claim 8 in which an electrostatic shield is positioned about the straight portions and loop of said conduit.

10. In a flowmeter, in combination, a conduit for carrying a fluid whose velocity is to be measured, means for establishing an alternating magnetic field in said conduit, said conduit having a bent portion so that the fluid therein passes through said field in one direction and then returns through the field in the opposite direction, means for measuring the potential induced in the flowing fluid by said field at two sections of said conduit at regions of equal magnetic field strength, the fluid flowing in opposite directions through said sections, and differential amplifying means for adding the velocity components of said induced voltages to produce a resultant voltage proportional to the flow velocity in said conduit.

DESLONDE R. DE BOISBLANC.

References Cited in the file of this patent

UNITED STATES PATENTS

| Number | Name | Date |
|---|---|---|
| 2,149,847 | Kolin | Mar. 7, 1939 |
| 2,435,043 | Lehde | Jan. 27, 1948 |

OTHER REFERENCES

Review of Scientific Instruments, vol. 16, pages 110, 113, 114, 1945.